United States Patent [19]

Inoue et al.

[11] Patent Number: 5,437,033
[45] Date of Patent: Jul. 25, 1995

[54] SYSTEM FOR RECOVERY FROM A VIRTUAL MACHINE MONITOR FAILURE WITH A CONTINUOUS GUEST DISPATCHED TO A NONGUEST MODE

[75] Inventors: Taro Inoue, Sagamihara; Hidenori Umeno, Kanagawa; Shunji Tanaka, Sagamihara; Tadashi Yamamoto, Kanagawa; Toru Ohtsuki, Hadano, all of Japan

[73] Assignee: Hitachi, Ltd., Tokyo, Japan

[21] Appl. No.: 787,074

[22] Filed: Nov. 4, 1991

[30] Foreign Application Priority Data

Nov. 16, 1990 [JP] Japan .................. 2-310814

[51] Int. Cl.⁶ .................. G06F 9/00; G06F 11/00
[52] U.S. Cl. ........................... 395/700; 395/575; 364/DIG. 1; 364/261.5; 364/261.6; 364/268; 364/280; 364/281.9; 364/285
[58] Field of Search ................ 395/275, 400, 575, 700

[56] References Cited

U.S. PATENT DOCUMENTS

| | | | |
|---|---|---|---|
| 4,674,038 | 6/1987 | Brelsford et al. | 395/575 |
| 4,799,145 | 1/1989 | Goss et al. | 395/700 |
| 4,816,991 | 3/1989 | Watanabe et al. | 395/400 |
| 4,843,541 | 6/1989 | Bean et al. | 395/275 |
| 4,975,836 | 12/1990 | Hirosawa et al. | 395/725 |
| 5,023,779 | 6/1991 | Federico et al. | 395/275 |
| 5,222,215 | 6/1993 | Chou et al. | 395/275 |
| 5,230,069 | 7/1993 | Brelsford et al. | 395/400 |

*Primary Examiner*—Thomas G. Black
*Assistant Examiner*—Wayne Amsbury
*Attorney, Agent, or Firm*—Fay, Sharpe, Beall, Fagan, Minnich & McKee

[57] ABSTRACT

A system and method for continuous operation of a virtual machine system having operation modes including a guest mode in which virtual machines are operated and a nonguest mode in which a virtual machine monitor for controlling the virtual machines is operated. The continuous guest is a virtual machine which does not stop executing operation at the occurrence of a failure due to program error of the virtual machine monitor. A main storage is provided with two areas. One of the two areas is a continuous guest area having the same host absolute address in the nonguest mode as a guest absolute address in the guest mode, the area is used by the continuous guest which is a virtual machine which continues to operate on transition of the operation mode from the guest mode to the nonguest mode. The other is an area in which a program module for dispatching the continuous guest in response to the transition of the operation mode from the guest mode to the nonguest mode. The continuous guest is allocated to the guest area on transition of the operation mode from the guest mode to the nonguest mode. Occurrence of a failure due to a program error of the virtual machine monitor is detected and by starting the program module for dispatching the continuous guest in response to the detection of the occurrence of the failure, the operation of the continuous guest does not stop executing.

17 Claims, 13 Drawing Sheets

F I G. 10
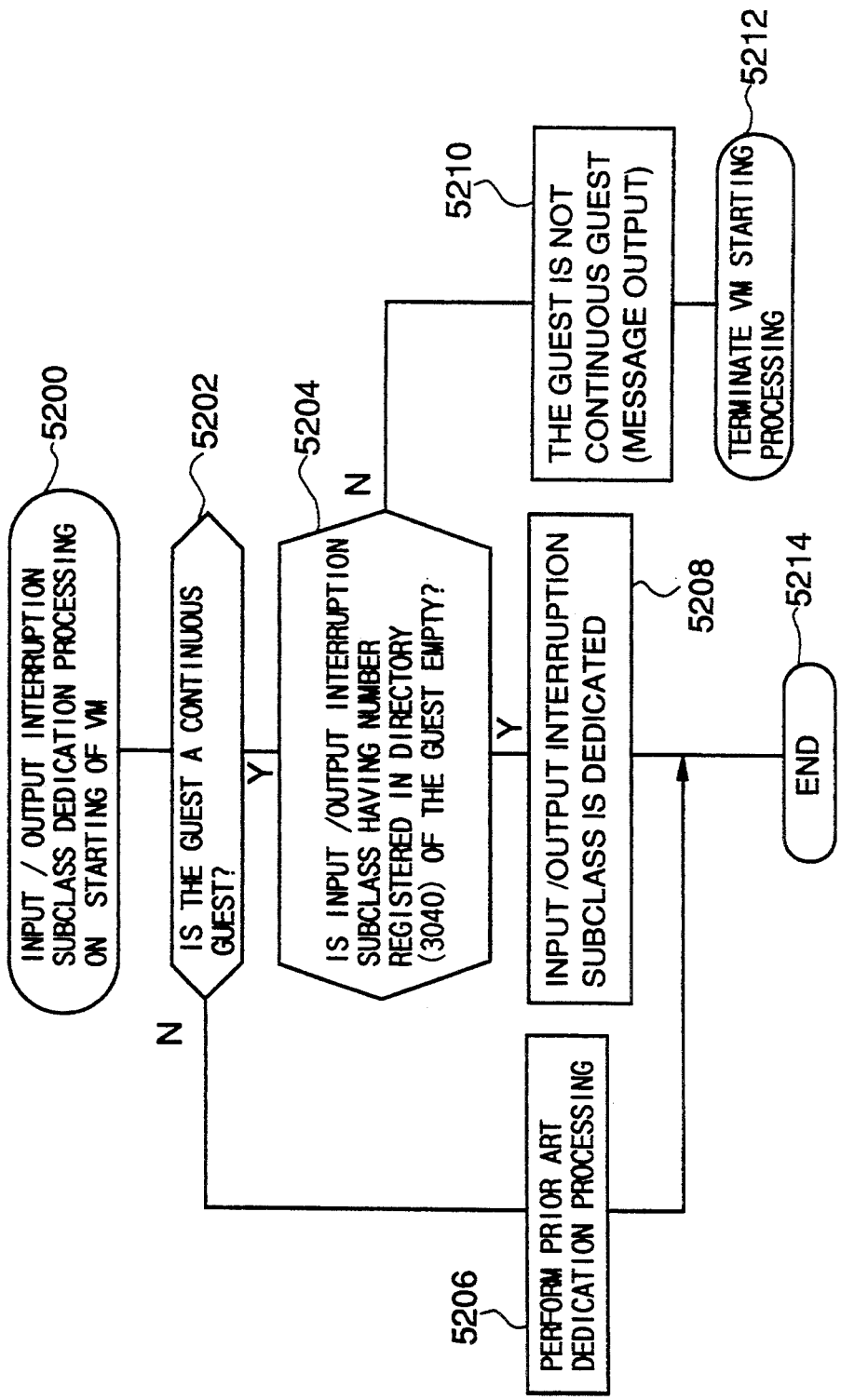

SYSTEM FOR RECOVERY FROM A VIRTUAL MACHINE MONITOR FAILURE WITH A CONTINUOUS GUEST DISPATCHED TO A NONGUEST MODE

BACKGROUND OF THE INVENTION

The present invention relates to a computer system for operating a plurality of virtual machines on a real machine and in particular to a method of continued operation of a given virtual machine even if a failure occurs due to a program error in a monitor program for controlling the virtual machines.

A virtual machine system is defined as a system for simultaneously operating a plurality of virtual machines (VM) on a real or bare machine. The virtual machine system is provided with a virtual machine monitor (VMM) for controlling the virtual machines; it executes scheduling, dispatching and instruction simulation, etc. of the virtual machines.

A system for achieving the similar objective of the virtual machine system which is referred to as a logical partition system has been recently developed. This system provides users with a hypervisor which operates hardware so that the hypervisor is concealed from the users. A hypervisor is similar to machine monitor for a Virtual Machine System, and it is used as a logical partition system. There is a logical partition (LPAR) which corresponds to a virtual machine in a virtual machine system.

In the virtual machine system or logical partition system, a table for storing control information for the virtual machines and a table for storing information of the system are disposed on a main storage. Whenever each virtual machine is dispatched, control information on program status words (PSW) of the dispatched computer stored in the main storage and the values of various registers such as general register and control register and the values of various timers are set on the real machine for starting the operation of the virtual machines. Definition of guest mode and nonguest mode will be made herein. The guest mode is defined as a mode in which virtual machines are operated. The nonguest mode is defined as a mode in which a virtual machine monitor for controlling the operation of the virtual machines or a hypervisor is operated. Switching from the nonguest mode to the guest mode is performed by issuing a start interpretive execution instruction (SIE instruction) from the virtual machine monitor or the hypervisor. If the SIE instruction is issued, control information on the program status words relating to the virtual machines designated by an operand of the instruction and values of various registers such as general register and control register is set on the real machine so that the designated virtual machine commences operation.

The OS of the virtual machines accesses to the main storage by using an absolute address (guest absolute address) of the virtual machine. However, the guest absolute address is different from the absolute address (host absolute address) on a real storage of a real machine in which the virtual machine is operated. Accordingly, a processing to translate the guest absolute address designated by the OS of the virtual machines into a host absolute address is executed.

An article "A Method to Change Operating Modes between a Bare Machine and a Virtual Machine", Toshio Taguchi, et al., Transactions of Information Processing Society of Japan, Vol. 22, No. 3, May 1981, pp. 206 to 215 describes a method of continuous operation of virtual machines on a bare machine on switching of OSs which have been operated on virtual machines if a virtual machine system is incorporated on a bare machine in which the guest mode does not differ from the nonguest mode.

SUMMARY OF THE INVENTION

It is an object of the present invention to provide a method and a system for continuous operation of a computer system which is capable of continuing the operation of a specific virtual machine even if a failure occurs due to a program error of the virtual machine monitor or the hypervisor, the program on the main storage may be destructed, resulting in stopping of the operation of the entire system.

It is another object of the present invention to provide a system and a method of continuous operation of a computer system, which is capable of continuing in the nonguest mode the operation of the OS which has been operated in the guest mode without pending an interruption by a virtual machine monitor and the hypervisor.

The above mentioned objects are based upon recognition of the problems of the prior art as follows:

The tables storing control information for the virtual machines and the tables storing information for the whole system reside in the main storage in both the above prior arts. Then, if a failure due to a program error were caused in a virtual machine monitor or a hypervisor, the programs in them may be destroyed in the main storage, causing the whole system to be brought down.

Recently, operations of on line systems or production systems on a virtual machine system or the logical partition system have been increased. In this case, influence when the system is stopped is very serious. Accordingly, continuous operation of the system when a failure occurs in the virtual machine monitor or the hypervisor has been demanded.

If the operation of the OS which has been performed on the virtual machine is continued, it is necessary to succeed the interruption which was held by the virtual machine monitor or the hypervisor prior to continuation of operation of the OS. However, there is the possibility that the interruption may disappear since the interruption held by the virtual machine monitor, etc. cannot be succeeded to the OS in the prior art.

The system for continuous operation of a computer system of the present invention, which is a preferred embodiment is formed as follows: A main storage is provided with an area in which the guest absolute address is equal to the host absolute address, which is used by virtual machines (continuous guest) which are continuously operated on transition from a guest mode to a nonguest mode, a guest area used by each virtual machine, an area in which a virtual machine monitor exists and an area for storing a module for dispatching the continuous guest. Means for detecting the occurrence of a failure due to a program error is provided in a processor. The module for dispatching the continuous guest in the main storage is started in response to the detection of the failure by failure occurrence detecting means. The method of continuous operation of a computer system which is another embodiment of the present invention is realized in the steps as follows:

If a failure occurs due to a program error in the virtual machine monitor, the virtual machine monitor stops the operation of all the virtual machines which are running in the guest mode in response to the generation of an interruption corresponding to the failure occurrence or an input of a command from an operator. The virtual machine monitor is dumped and one operating system on the virtual machine which is operated in the guest mode is changed to the nonguest mode and is operated. In the above mentioned embodiment, the virtual computer which changes from the guest mode to the nonguest mode and continues to operate may be V=R type (the virtual address space is equal to the real address space) virtual machines. The virtual machine monitor may dedicate the instruction processor of the real machine system having the same number as that of the instruction processor used by the virtual machine to the virtual machine.

The virtual machine monitor may dedicate the input/output interruption subclass of the real machine system having the same number as that of the input/output subclass used by the virtual machine to the virtual machine.

When the interception or host interruption is generated, the real machine system may transfer information on the operation of the guest PSW of the instruction processor, a part of the general register, the guest control register, the guest clock comparator and the guest CPU timer to the virtual machine monitor area of the main storage and save it therein. When the guest is the virtual machine which continues to operate from the guest mode to the nonguest mode (continuous guest), the real machine system may transfer the information or the operation of the remaining general registers and the access register to the hardware system area (HSA) in the main storage and save it therein.

The virtual machine (continuous guest) which changes the operation from the guest mode to the nonguest mode may be dispatched by starting the module stored in the hardware system area (HSA) in the main storage.

A logical partition system may be provided in lieu of the virtual machine system. A logical partition may be provided in lieu of a virtual machine and a hypervisor may be provided in lieu of the virtual machine monitor.

If an interception or host interruption is generated in the virtual machine system or the logical partition system and the guest mode in which the virtual machine is run is changed to the nonguest mode in which the virtual machine monitor or the hypervisor is run in each of the preferred embodiments, the control information of the virtual machine is also saved in an area other than the address space (hardware system area: HSA). Even if a failure occurs due to a program error of the virtual machine monitor or the hypervisor so that the control information of the virtual machine stored on the address space is destructed, the control information of the virtual machine stored in the HSA remains without being destructed. Therefore, it is possible to continuously execute the operation of the virtual machine by using the remaining control information. Even if a failure occurs due to a program error in the virtual machine monitor or the hypervisor, a program for starting the continuous operation of the virtual machine which is necessary for the continuous operation can be remain without being destructed by keeping an area for storing the continuation starting program on the HSA. The virtual machine of the V=R type is applied to the virtual machine which requires the continuous operation. Since a continuous area from a lower order in the real storage is dedicated in the V=R type virtual machine so that the address of the main storage of the virtual machine is equal to the address of the real storage, it is not necessary to translate the address from the guest absolute address to the host absolute address.

The instruction processor of the real machine system having the same number as the processor number used by the virtual machine to be continuously operated is dedicated to the virtual machine (continuous guest) and the input/output interruption subclass of the real machine system having the same number as that of the input/output interruption subclass used by the virtual machine to be continuously operated is dedicated to the virtual machine (continuous guest). This causes the input/output interruption to be is executed without being held by the virtual machine monitor or the hypervisor. As a result of this, the input/output interruption does not disappear since the input/output interruption is not held by the virtual machine monitor or the hypervisor if the operation of the OS which has been operated in the guest mode is continued in the nonguest mode.

BRIEF DESCRIPTION OF THE DRAWINGS

The objects and features of the invention will best be understood from a detailed description of preferred embodiment thereof, selected for purposes of illustration and shown in the accompanying drawings, in which:

FIG. 10 is a flow chart of the input/output interruption subclass dedicated processing of the virtual machine monitor or hypervisor;

DESCRIPTION OF A PREFERRED EMBODIMENT

Now an embodiment of the present invention will be described with reference to the drawings.

Figure 1A:
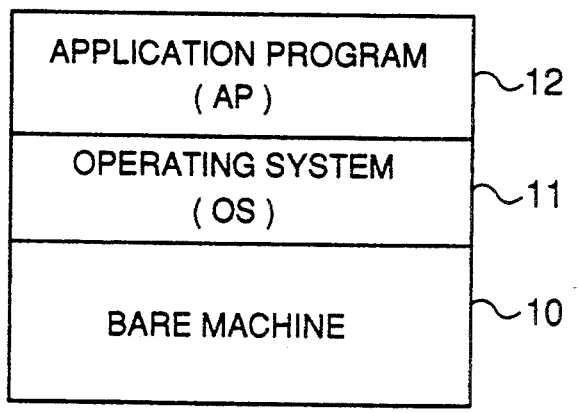
FIGS. 1A-1B are explanatory views showing the principle of the operation of an embodiment of the present invention.
Figure 1B:
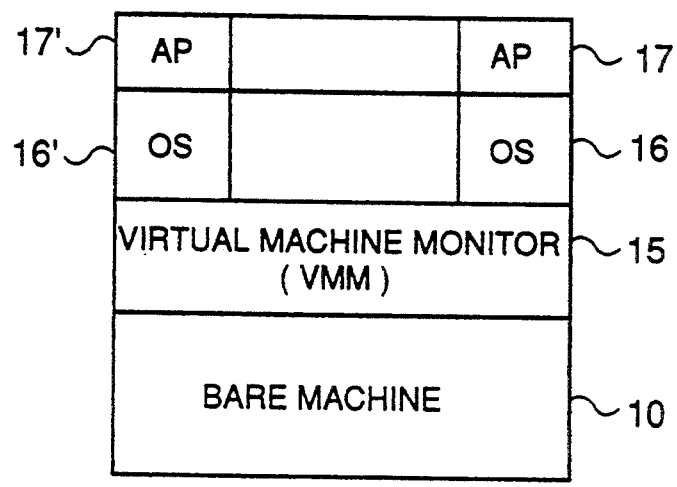

FIGS. 1A-1B are explanatory views showing the principle of the operation of the present invention.

FIG. 1A is an operation state diagram of a real machine and an operation state view of a continuous guest and FIG. 1B is an operation state diagram of a virtual machine.

In operation of the real machine, an operating system (OS) is run on a bore of real machine 10 in a supervisor mode and an application program (AP) 12 is run thereon in a problem mode as shown in FIG. 1A.

In operation of a virtual machine system, a virtual machine monitor (VMM) 15 is run on a bore of real machine 10 in a nonguest mode and OS 16 of a plurality of virtual machines are run thereon in a guest mode and an application program (AP) 17 is run on each of OS16 of the virtual machine as shown in FIG. 1B. The virtual machine monitor (VMM) 15 performs dispatching of the OS 16 of each virtual machine and simulation of instructions as mentioned above. If a failure occurs due to a program error in the virtual machine monitor 15 in running of the virtual machine, OS 16 of all the virtual machines stop and information for the virtual machine stored in a main storage of the real machine 10 may be destructed.

Therefore, if a failure occurs in the virtual machine monitor 15, the state of FIG. 1B is changed to the state of FIG. 1A so that one of the OS 16 of the virtual machine is run in a supervisor mode in lieu of OS 11 in this embodiment. In this case, dispatching or instruction simulation which is performed by VFLM 15 is eliminated and the following functions are provided so that the OS 16 of the virtual machine is directly run on the real computer 10:

(i) A function of detect the failure due to a program error of the virtual machine monitor (VMM) by a microprogram and a function to start a continuous dispatch module stored in the main storage in response to the detection of the failure are provided in an instruction processor in the real machine 10.

(ii) In order to eliminate an address translation from guest absolute address into host absolute address, for the OS of a given virtual machine which is necessary to be continuously operated among the OS of a plurality of virtual machines, a V=R type virtual machine, that is, a virtual machine in which guest absolute address is equal to host absolute address is left.

(iii) An instruction processor of the real machine having the same number equal as that of the instruction processor used by the virtual machine is dedicated.

(iv) An input/output interrupting subclass of the real machine having the same number as that of an input/output interrupting subclass used by the virtual machine is dedicated. Dedication of the instruction processor and the input/output subclass to a specific virtual machine in such a manner eliminates simulation by VMM. Accordingly, the OS of the virtual machine can be run in a supervisor mode.

(v) Information on operation of the virtual machine which is continuously operated is in a hardware system area (HSA) in a main storage and a program for continued operation of the OS of the virtual machines is stored therein. Even if control information for the virtual machine which is stored in the virtual machine monitor area in the main storage disappears by this, it is possible to perform a continuous operation by using the operation information and the continuous operation program which is stored in HSA in a duplexed manner.

Figure 2:
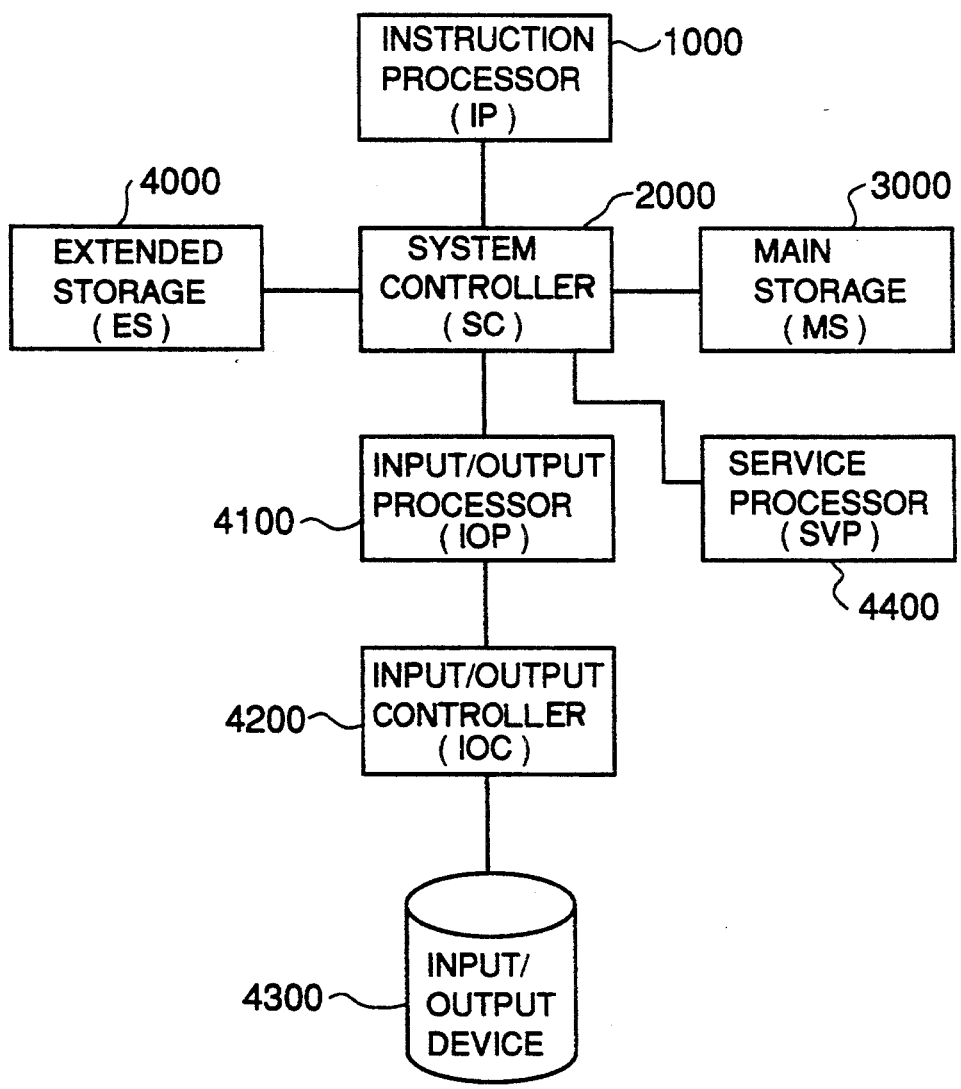
FIG. 2 is a block diagram showing the structure of an embodiment of the present invention.

FIG. 2 is a block diagram showing the entire structure of a computer system.

The virtual machine which is continuously operated from the guest mode to the nonguest mode is referred to as "continuous guest".

A reference numeral 1000 denotes an instruction processor (IP) for executing a program; 2000 a system control (SC) for accessing to a main storage and an expanded storage; 3000 a main storage (MS) for storing a program and data; 4000 an expanded storage (ES) which compensated for insufficient capacity of the main storage; 4100 an input/output processor (IOP) for executing an input/output operation; 4200 an input/output control (IOC) for controlling input/output devices; 4300 an input/output device for executing the input/output operation; 4400 a service processor (SVP) for executing a service operation for monitoring or testing.

Although only one unit for each device is shown in FIG. 2, a plurality of devices may exist.

Figure 3:
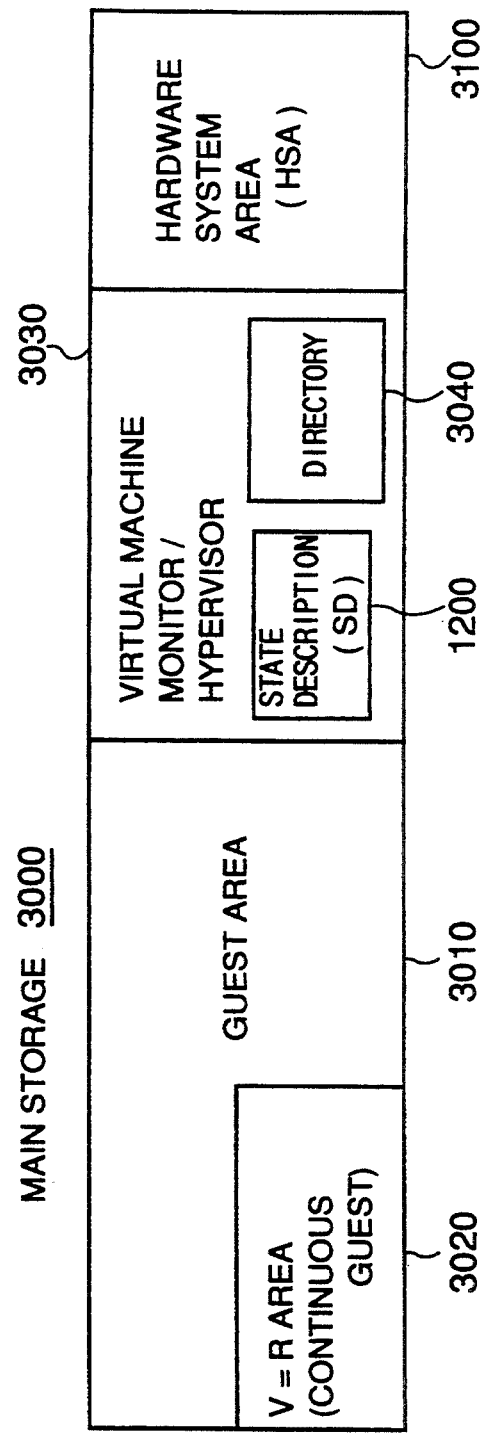
FIG. 3 is a diagram showing the area structure of a main storage in FIG. 2.

FIG. 3 is a diagram showing the structure of the main storage 3000 in FIG. 2.

In FIG. 3, reference numerals 3010 and 3020 denote a guest area used by each virtual machine and V=R area (continuous guest area) of the continuous guest, respectively. In order to provide the continuous guest area 3020 with an attribute V=R (the guest absolute address is equal to the host absolute address), a continuous area from a lower order address (address 0) of the real main storage 3000 is allocated as a continuous guest area 3020 so that the main storage (absolute) address of the continuous guest is equal to the (absolute) address of the real main storage 3000. A virtual machine monitor or hypervisor area 3030 is located in a higher order address of the guest area. A directory 3040 and an SD (State Description) 1200 are disposed in the area 3030. Information on whether or not the guest is a continuous guest and if the guest is a continuous guest, the number of the input/output interrupting subclass (provided for each of priority of input/output interruption) used by the OS of the continuous guest and the number of the instruction processor are stored in the directory 3040. Operand information of SIE (Start Interpretive Execution instruction) which is an instruction for switching from the nonguest mode to the guest mode is stored in SD 1200.

A reference numeral 3100 denotes a hardware system area (HSA). Information on the interface between the hardware and the operating system is stored in the HSA 3100, which is accessed by a special instruction. As interface information, information on the continuous guest is stored.

Figure 4:
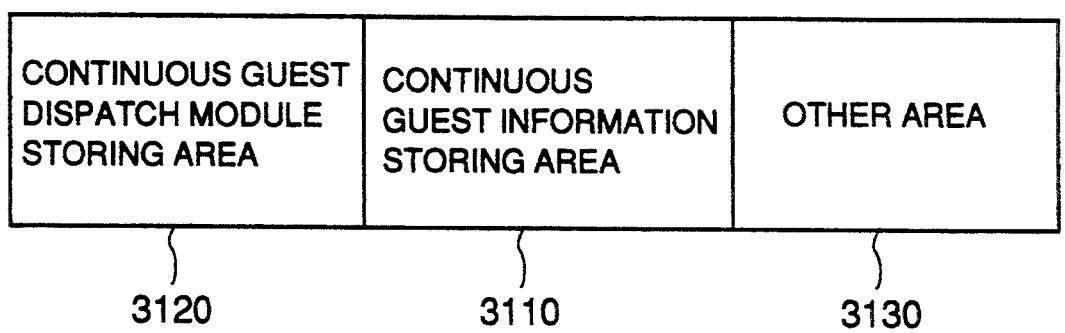
FIG. 4 is a diagram showing the detailed structure of a hardware system area (HSA) in FIG. 3.

FIG. 4 is a diagram showing the detailed structure of HSA in FIG. 3.

HSA 3100 comprises an area in which information on the continuous guest, that is, a continuous guest information storing area 3110, an area 3120 for storing a module (program) for dispatching the continuous guest and the other area 3130.

Figure 5:
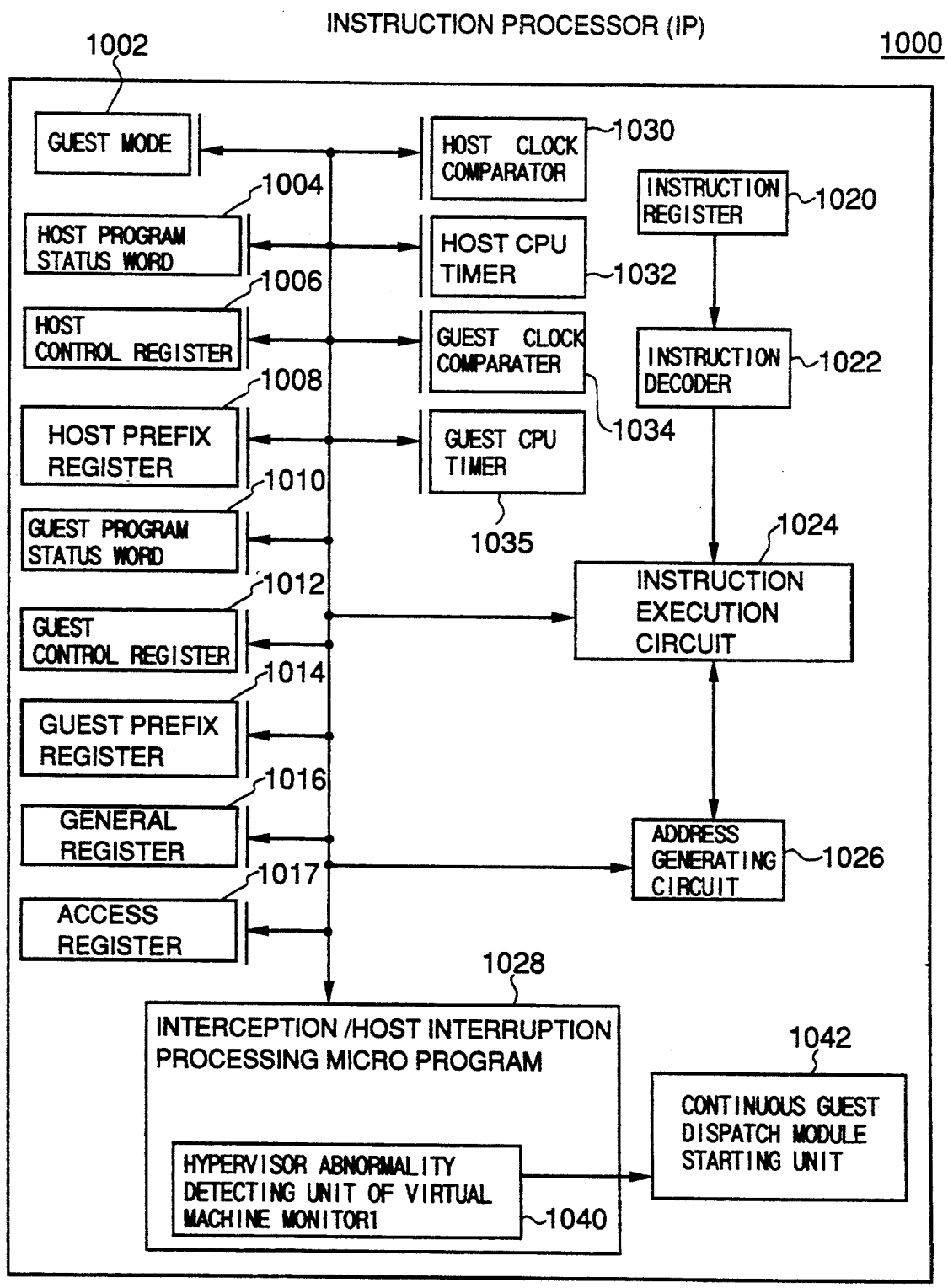
FIG. 5 is a block diagram showing the structure of an instruction processor (IP) in FIG. 2.

FIG. 5 is a block diagram showing the main units of the instruction processor in FIG. 2.

The instruction processor 1000 is provided with an instruction register 1020 for storing instructions read from the main storage 3000, an instruction decoder 1022 for decoding the instruction, an instruction execution circuit 1024 for executing the instruction, and an address generating circuit 1026 for generating the address.

In the address generating circuit 1026, address translation from a virtual address to a real address and prefix translation from a real address to an absolute address are achieved.

As various registers, a guest mode bit 1002, a host program status word (host PSW) 1004 corresponding to a host (VMM; virtual machine monitor), a host control register (host CR) 1006, a host prefix register 1008, a guest program status word (guest PSW) 1010 corresponding to the guest, a guest control register (guest CR) 1012, a guest prefix register 1014, a general register 1016 and an access register 1017 are provided. The general register 1016 and the access register 1017 are commonly used by a host and a guest. The general register 1016 comprises 16 registers, the register numbers of which are to 15.

A host clock comparator 1030, a host CPU timer 1032, a guest clock comparator 1034 and a guest CPU timer 1036 are used as timers.

An interception/host interrupting processing microprogram 1028, a virtual machine monitor or hypervisor abnormality detecting unit 1040 and a continuous guest dispatch module starting unit 1042 are provided.

It is assumed that the SIE instruction be issued to change to the guest mode. The SIE instruction has information on SD 1200 which is an area in which information on the guest of the main storage 3000 as an operand. The SD 1200 is disposed on the virtual machine monitor/hypervisor area 3030 in the main storage as mentioned above.

Figure 6:
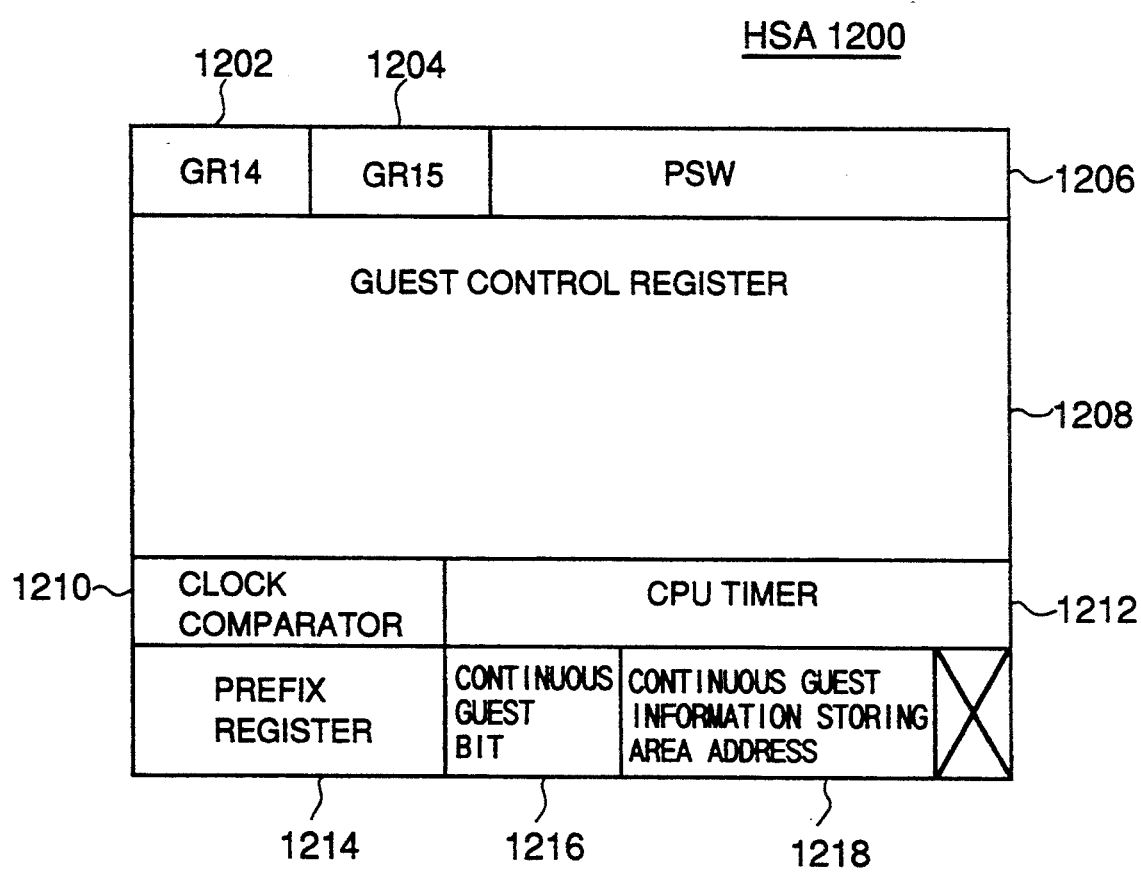
FIG. 6 is a diagram showing the detailed structure of the state description (SD) in FIG. 3.

FIG. 6 is a diagram showing the detailed structure of the SD area 1200 on the main storage in FIG. 3.

Only components related with the present invention among the SD 1200 are shown.

In FIG. 6, a reference numeral 1201 denotes an area for storing the contents of the general register (GR) 14 of the guest; 1204 an area for storing the contents of the general register (GR) 15 of the guest; 1206 an area for storing the contents of the guest PSW 1010; 1208 an area for storing the contents of the guest control register 1012; 1210 an area for storing the contents of the guest clock comparator 1034, that is, a value of a clock preset as an object to be compared; 1212 an area for storing the value of the guest CPU timer 1036; 1214 an area for storing the contents of the guest prefix register 1014. A reference numeral 1216 denotes a continuous guest bit indicating whether or not the guest in interest is a continuous guest. When the bit is "1", it indicates that the guest in interest is a continuous guest. Designation of the continuous guest is carried out in accordance with the information which has been preliminarily preset in the directory 3040 (refer to FIG. 3). A reference 1218 denotes a continuous guest information storing area address for storing the information (SD, registers 0 to 13 among the general register, and access register) which is necessary for continued operation of the continuous guest in a nonguest mode. The continuous guest information storing area address 1218 represents a starting address in a hardware system area (HSA) 3100 of the continuous guest information storing area 3120 shown in FIG. 4.

Figure 7:
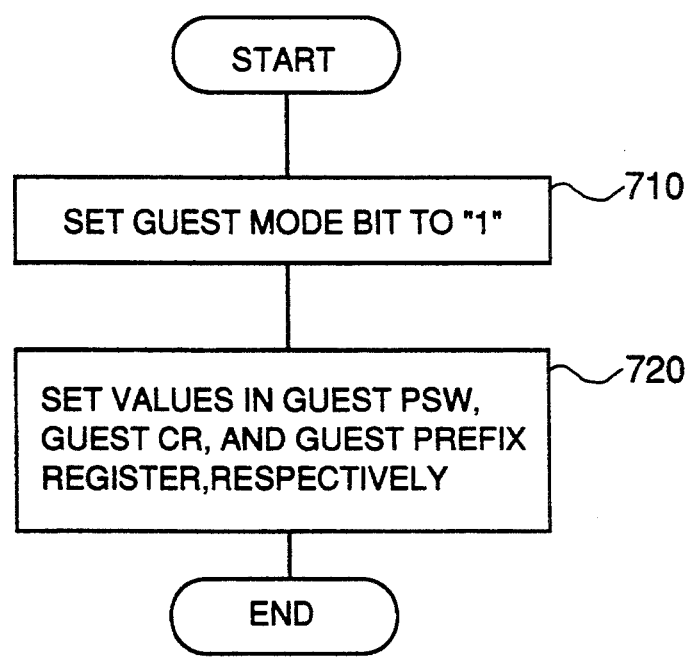
FIG. 7 is a flow chart of a microprogram which is executed in an instruction execution circuit in response to an issue of an SIE instruction (Start Interpretive Execution instruction)

If the SIE instruction is issued from the virtual machine monitor or the hypervisor, processing by a microprogram shown in FIG. 7 is firstly executed by the instruction execution circuit 1024 of FIG. 5. "1" representing that the guest is running is set to the guest mode bit 1002 (step 710).

The contents of the PSW 1206 of the guest, the control register 1208, and the prefix register 1214 which are stored in the SD 1200 which is designated by the operand of the SIE instruction are set in the guest PSW 1010, the guest CR 1012 and the guest prefix register 1014, respectively (step 720). Values which are set depending upon the execution conditions of the virtual machine monitor (VMM) are held in the host PSW 1004, the host CR 1006, the host prefix register 1008. This starts the operation of the guest.

Figure 8:
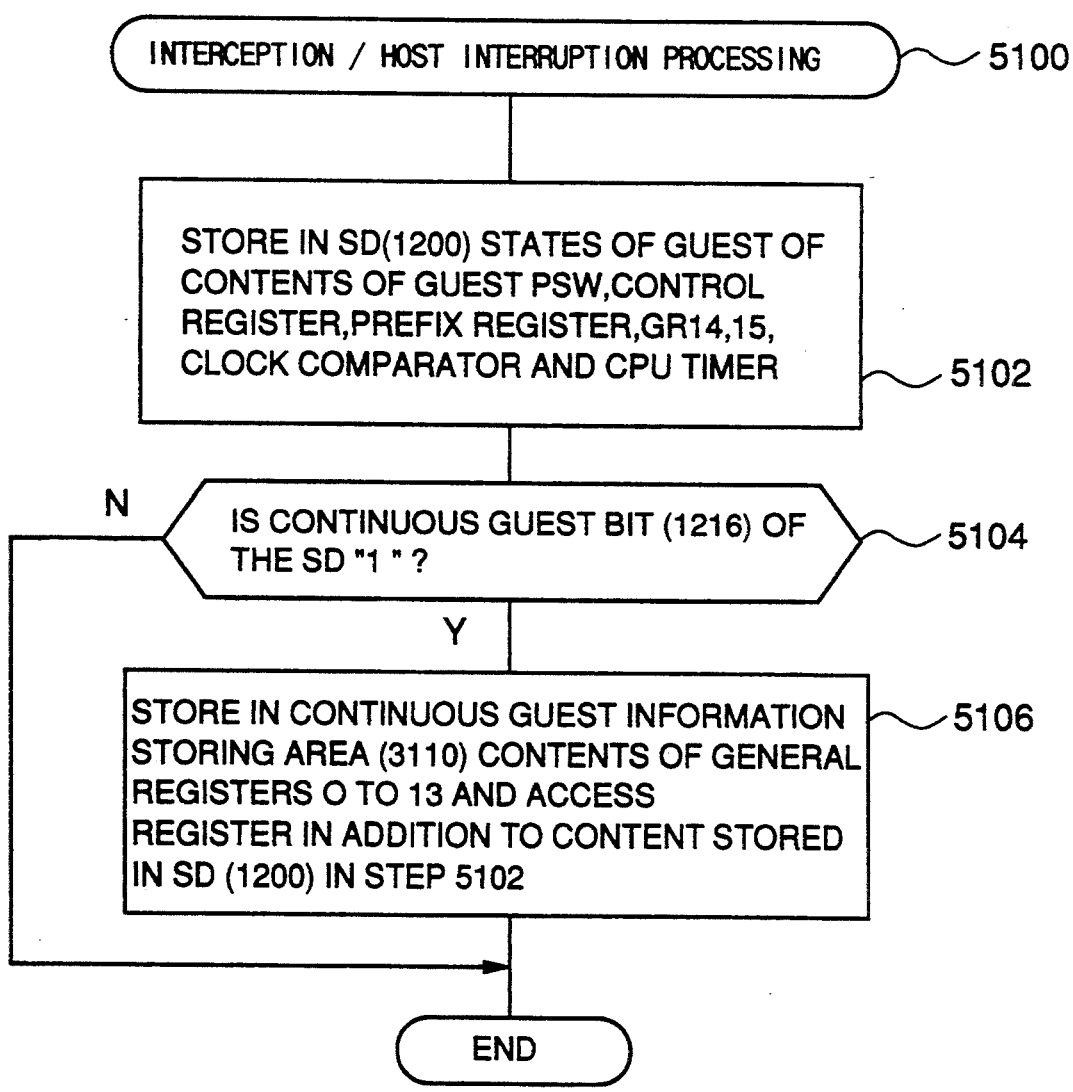
FIG. 8 is a flow chart of a microprogram for executing a process corresponding to the interception or host interruption.

FIG. 8 is a flow chart of the processing of a microprogram in the embodiment in case an interception or host interruption occurs.

If the interception or host interruption occurs (step 5100), the current state of the guest, that is, the contents of the guest PSW 1010, GR14 of the general register 1016, the guest control register 1012 and the values of the reference clock of the guest clock comparator 1034 and the value of the guest CPU timer 1036, etc. are stored in the SD of the main storage for the next execution of the virtual computer in interest (step 5102). Subsequently, the continuous guest bit 1216 of the SD of the guest in interest is checked (step 5104). If the value is "1", then the contents of the registers stored in SD 1200 in step 5102 and the contents of the registers 0 to 13 among the general register 1016 and the access register 1017 are also stored in the continuous guest information storing area 3110 in the HSA 3100 which has been preliminarily designated by the continuous guest information storing area starting address 1218 (step 5106) since the guest is the continuous guest.

If the continuous guest bit of the SD 1200 of the guest in interest is "0", storage into the continuous guest information storing area 3110 is not carried out since the guest in interest is not the continuous guest.

In processing of the steps 5104 and 5106, among the processing of the microprogram of FIG. 8, the virtual machine monitor or hypervisor may use an instruction to store the data in an area in HSA after generation of the interception or host interruption.

Figure 9:
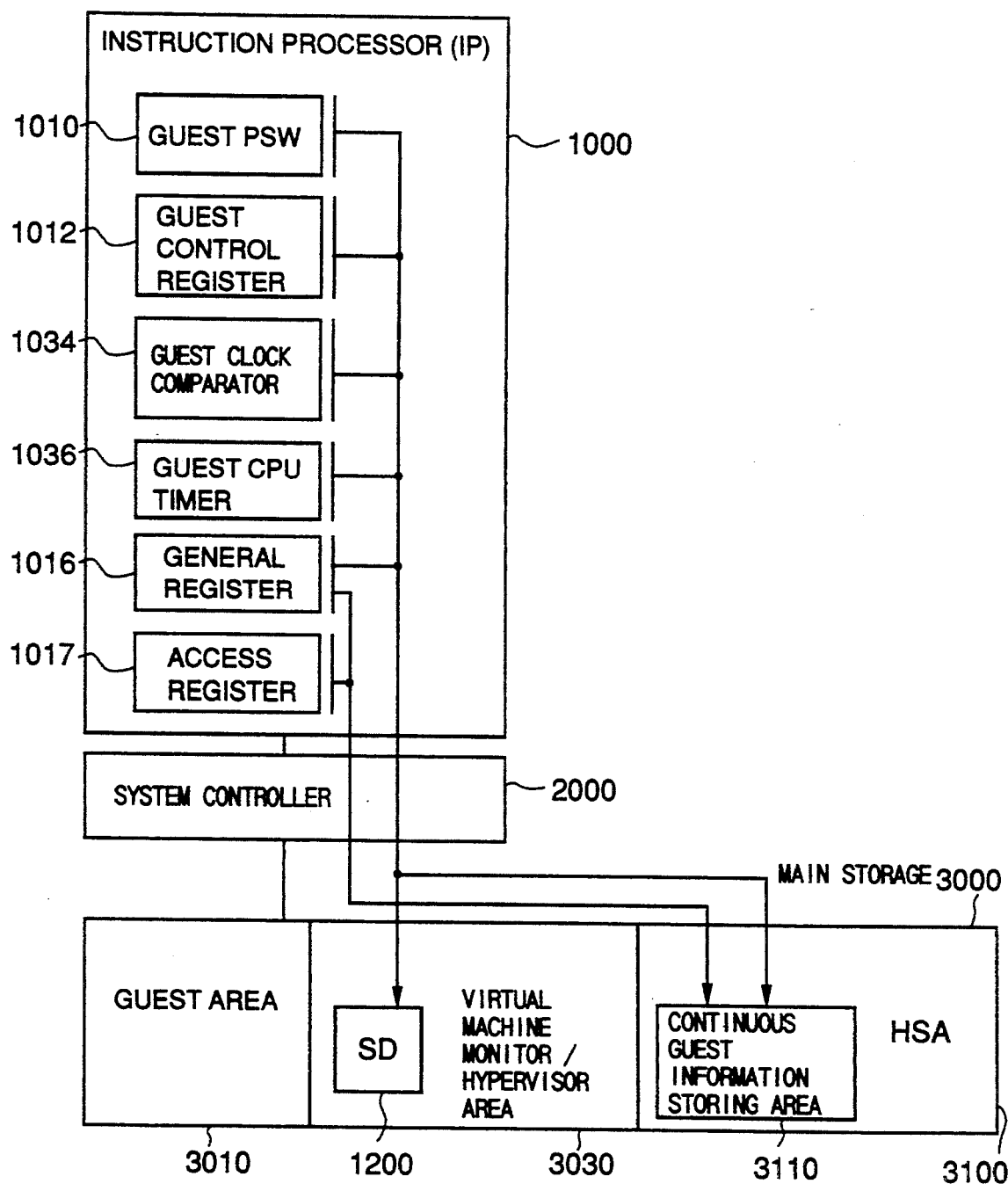
FIG. 9 is a block diagram showing a processing corresponding to the interception or host interruption.

FIG. 9 is a block diagram showing the flow of data of microprogram processing of FIG. 6.

If the interception or host interruption occurs, the contents of the guest PSW 1010 in the instruction processor 1000, GR 14 and 15 of the general register 1016, the guest control register 1012, the guest clock comparator 1034, the guest CPU timer 1036 are transferred to the SD 1200 in the main storage via a system controller 2000. If the guest in interest is the continuous guest, in addition to the above mentioned contents (the contents stored in the SD 1200), the contents of the GR 0 to 13 among the general register 1016 and the access register 1017 are also transferred to the continuous guest information storing area 3110 in the HSA 3100 which has been preliminarily designated by the continuous guest information storing area start address 1218 in SD 1200.

This causes information on the operation of the continuous guest to be duplexed. Accordingly, information stored in the continuous guest information storing area 3110 in HSA 3100 will not be destructed even if an error occurs in the program of the virtual machine monitor/hypervisor. Therefore, operation of the continuous guest can be continued.

FIG. 10 is a flow chart of the processing of the virtual machine monitor/hypervisor for the dedication of the input/output interruption subclass to the continuous guest.

Determination whether or not the guest is the continuous guest is made by the directory 3040 in the virtual machine monitor/hypervisor area 3030 of the main storage in which the information which is set for the guest by the user is stored in the starting processing of the virtual machine (step 5202). If the guest is the continuous guest, a determination is made whether or not the input/output interruption subclass of the real machine having the same number as that of the input/output interruption subclass used by the OS which is operated on the continuous guest registered (initially preset) in the directory 3040 of the guest in interest, that is, whether or not the input/output interruption subclass is empty (step 5204). As a result, if dedication of even one input/output interruption subclass of the real machine having the same number as the continuous guest in interest is impossible for the reason that the input/output interruption subclass has been dedicated to the other guest already. A message that the guest in interest cannot be continuous is outputted (step 5210). The starting processing of the virtual machine is terminated (step 5212).

If the result of the determination in step 5204 shows that dedication is possible, the input/output interruption subclass is dedicated (step 5208).

If a result of determination in step 5202 shows that the guest in interest is not the continuous guest, usual dedication processing of the input/output interruption subclass is performed (step 5206).

Figure 11:
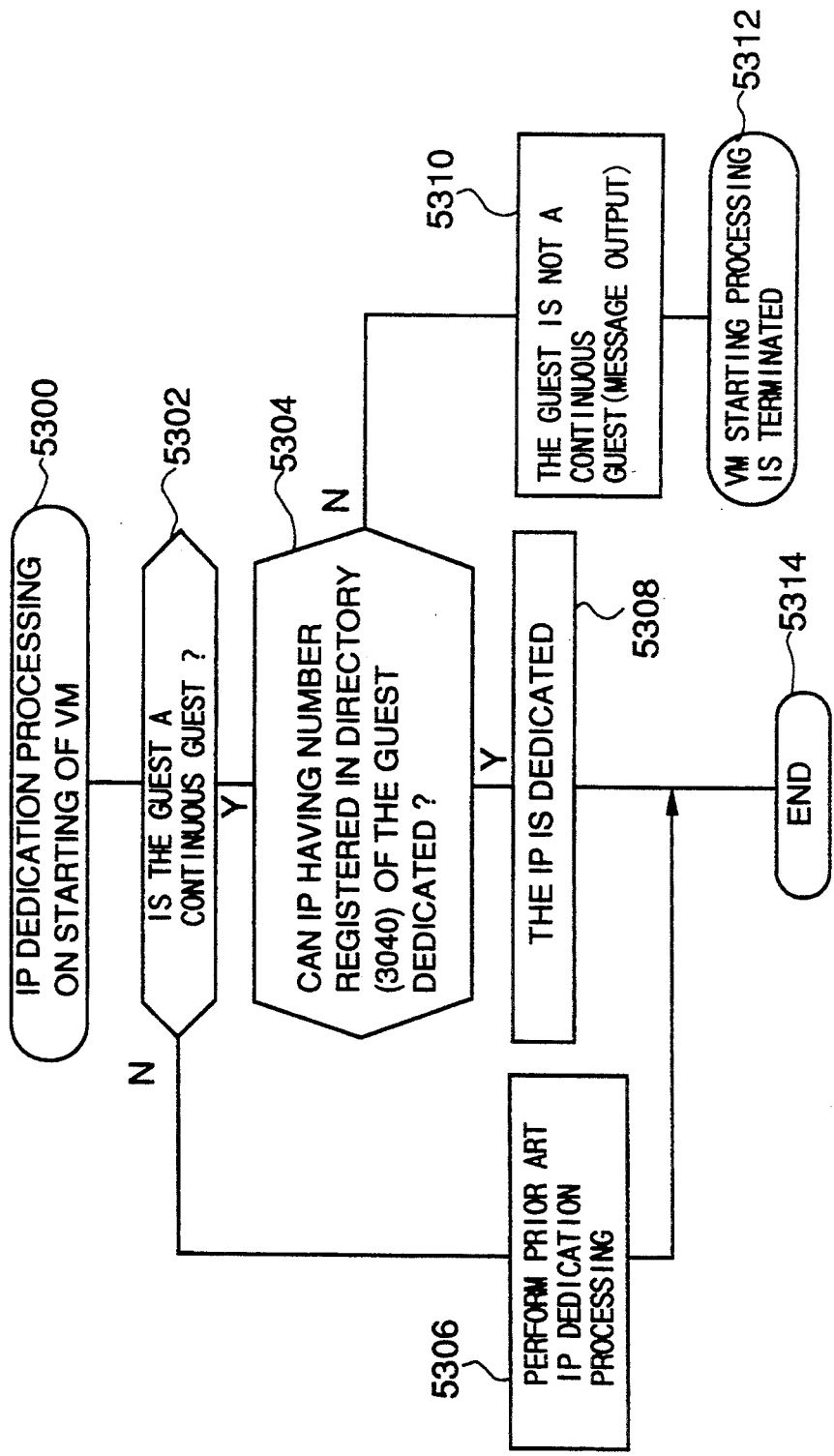
FIG. 11 is a flow chart of the instruction processor (IP) dedicated processing of the virtual machine monitor or hypervisor.

FIG. 11 is a flow chart of the processing of the virtual machine monitor/hypervisor for the dedication of the instruction processor (IP) to the continuous guest.

Determination whether or not the guest is the continuous guest is firstly made based on the information which the user of the guest in interest preset in the starting processing of the virtual machine (step 5302).

If the guest is the continuous guest, determination is made whether or not the instruction processor of the real machine having the same number as that of the instruction processor used by the OS which is operated on the continuous guest registered (initially preset) in the directory 3040 of the guest in interest (step 5304). If dedication of even one instruction processor of the real machine having the same number the continuous guest in interest is impossible for the reason that the instruction processor has been dedicated to the other guest already. A message that the guest in interest cannot be continuous is outputted (step 5310). The starting processing of the virtual machine is terminated (step 5312).

If the result of the determination in step 5304 shows that dedication is possible, instruction processor is dedicated (step 5308).

If a result of determination in step 5302 shows that the guest in interest is not the continuous guest, usual dedication processing of the instruction processor is performed (step 5306).

As described above with reference to FIGS. 10 and 11, the dedication of the input/output interruption subclass and the instruction processor to the continuous guest causes all the input/output interruption relating to the guest in interest to be directly executed without being held in the virtual machine monitor or hypervisor. As a result of this, if the operation is changed from the guest mode to the nonguest mode, the input/output interruption held in the virtual machine monitor or hypervisor will not disappear.

Figure 12:
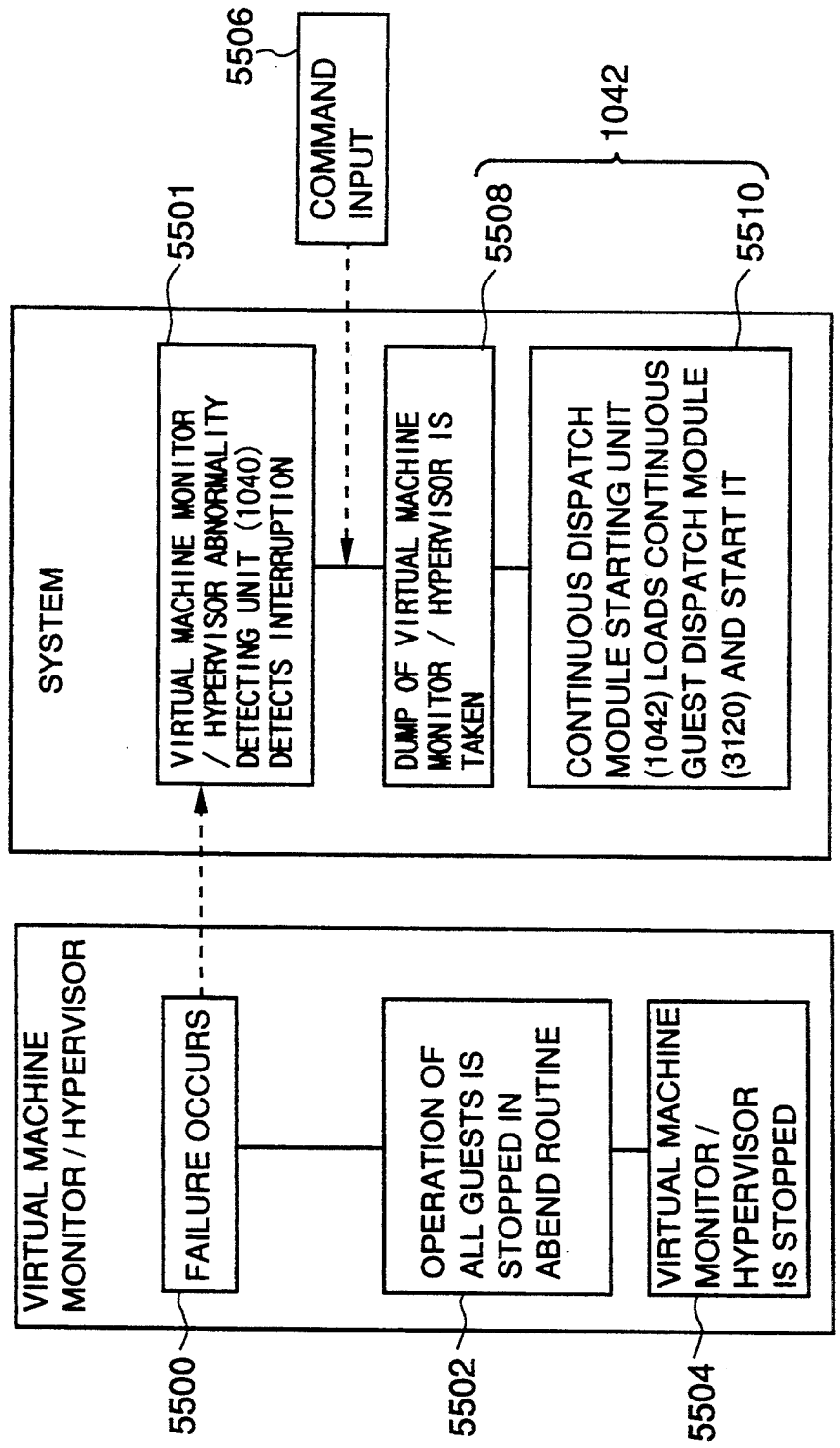
FIG. 12 is a flow chart showing the flow until starting of the continuous operation of a continuous guest.

FIG. 12 is a flow chart showing the flow until the continuous operation is started.

In the drawing, a left side block represents a virtual machine monitor/hypervisor while a right side block represents a system (real machine). If a failure due to a program error occurs in the virtual machine monitor/hypervisor (step 5500), the virtual machine monitor/hypervisor abnormality detection unit 1040 generates an interruption corresponding to this event (step 5501). This causes the guest continuous operation. This guest continuous operation can also be started by inputting a command by an operator (step 5506).

The virtual machine monitor/hypervisor stops itself (step 5504) after having stopped the operation of all guests including running continuous guest in abnormal end of a task or an abend routine (a routine for stopping a faulty operation for terminating the occurrence of an error) (step 5502).

Then, the system takes a dump of the virtual machine monitor/hypervisor (step 5508). Then the continuous guest dispatch module starting unit 1042 is started by loading a module 3120 for dispatching a continuous guest stored in HSA 3100 (step 5510).

Figure 13:
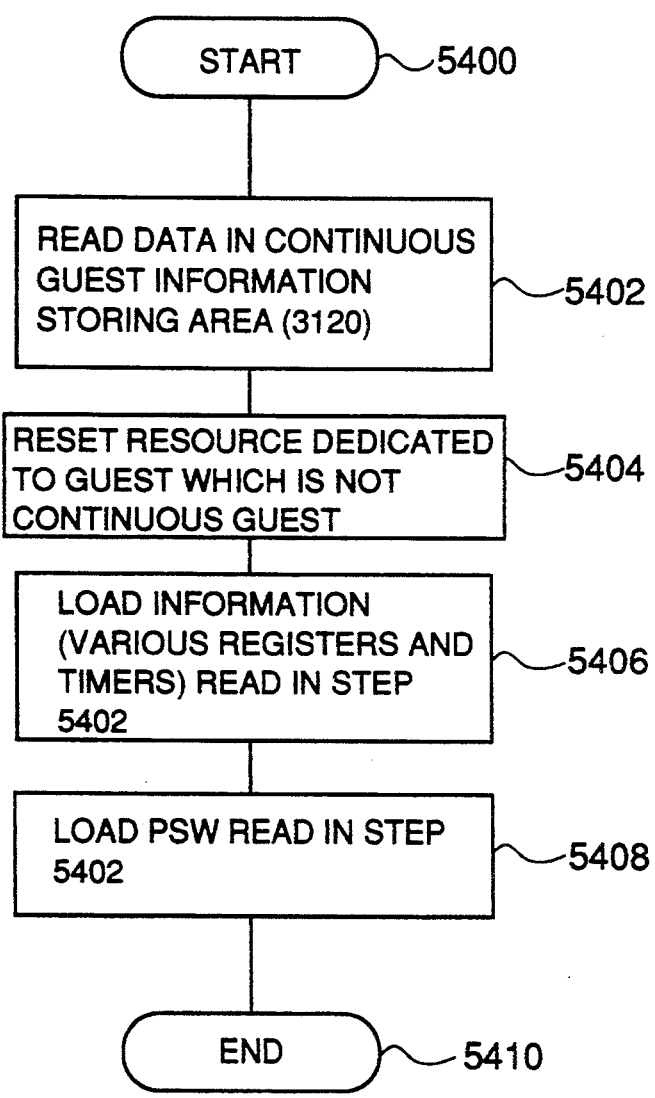
FIG. 13 is a flow chart showing the processing of a module for dispatching the continuous guest.

FIG. 13 is a flow chart showing the operation of the module for dispatching a continuous guest stored in HSA.

Information in the continuous guest information storing area 3110 within HSA 3100 is read by using a diagnose instruction for reading the data in HSA 3100 (step 5402) and a resource which is dedicated to a guest which is not a continuous guest is reset (step 5404). The resource to be reset is, for example, an input/output device which is operated in response to an input/output instruction which is issued by the guest. Since the guest stops operation and cannot process a termination interruption from the input/output device, the resource is reset so that the termination interruption is not generated.

The information which is read out in step 5402, that is, the contents of the general register, access register, the control register, the clock comparator, are the CPU timer, etc. are loaded into the real machine (step 5406). The PSW which is read is then loaded by using the LPSW instruction (Load PSW instruction) (step 5408).

This resumes the operation of the continuous guest. The processing in the series of steps 5402 to 5408 is executed in nonguest mode. The continuous guest is operated in the nonguest mode in order to dispatch the continuous guest by using the LPSW instruction, not the SIE instruction.

As mentioned above, the operation of only the continuous guest provided with an attribute V=R which is preliminarily designated can be continuously executed in the preferred embodiment of the present invention, even if a program error occurs in a virtual machine monitor of a virtual machine system or hypervisor of a logical partition system.

The input/output interruption subclass having the same number as that of the input/output interruption subclass used by the OS on the continuous guest is dedicated to the continuous guest and the instruction processor of the real machine having the same number as the instruction processor used by the OS on the continuous guest is dedicated to the continuous guest so that the input/output interruption related with the continuous guest is directly executed without being held in the virtual machine monitor or hypervisor. As a result of this, there is an advantage the input/output interruption held in the virtual machine monitor or hypervisor will not disappear on transition operation from the guest mode to the nonguest mode.

We claim:

1. A system for recovery from a virtual machine monitor failure of a virtual machine system having operation modes including a guest mode in which virtual machines are operated and a nonguest mode in which a virtual machine monitor for controlling said virtual machines is operated, the system comprising:

a main storage which is connected with said virtual machine system including, a continuous guest area having the same host absolute address as a guest absolute address, and being occupied by a continuous guest virtual machine which continues to operate even if a failure due to a program error of said virtual machine monitor has occurred, and an area in which is stored a program module for dispatching said continuous guest virtual machine in the nonguest mode in response to detection of said failure;

means for allocating said continuous guest virtual machine to said guest area;

means for detecting the occurrence of said failure due to said program error of said virtual machine monitor; and means for starting said program module for dispatching said continuous guest virtual machine in response to the detection of the occurrence of said failure by said detecting means.

2. The system for recovery from a virtual machine monitor failure of a virtual machine system according to claim 1, wherein said virtual machine monitor includes means for dedicating to said continuous guest virtual machine an instruction processor of said virtual machine system corresponding to the instruction processor which is used by said continuous guest virtual machine.

3. The system for recovery from a virtual machine monitor failure of a virtual machine system according to claim 1, wherein said virtual machine monitor includes means for dedicating to said continuous guest virtual machine an input/output interruption subclass of said virtual machine system corresponding to the input/output interruption subclass used by said continuous guest virtual machine.

4. The system for recovery from a virtual machine monitor failure of a virtual machine system according to claim 1, wherein said main storage further includes a hardware system area (HSA) and said virtual machine system includes means for saving in said hardware system area (HSA), information which is necessary for continuous operation of said continuous guest virtual machine in response to occurrence of the interception/host interruption.

5. A system for recovery from a hypervisor failure of a logical partition system having operation modes including a guest mode in which logical partitions are operated and a nonguest mode in which a hypervisor for controlling said logical partitions is operated, the system comprising:

a main storage which is connected with said logical partition system including, a continuous guest area having the same host absolute address as a guest absolute address, and being occupied by a continuous guest which is a logical partition which continues to operate even if a failure due to a program error of said hypervisor has occurred, and an area in which is stored a program module for dispatching said continuous guest in the nonguest mode in response to detection of said failure;

means for allocating said continuous guest to said guest area;

means for detecting the occurrence of said failure due to said program error of said hypervisor; and means for starting said program module for dispatching said continuous guest in response to the detection of the occurrence of said failure by said detecting means.

6. A method of recovery from a virtual machine monitor failure of a virtual machine system, having operation modes including a guest mode in which virtual machines are operated and a nonguest mode in which a virtual machine monitor for controlling said virtual machines is operated, connected with a main storage including, a continuous guest area having the same host absolute address as a guest absolute address, and being occupied by a continuous guest virtual machine which continues to operate even if a failure due to a program error of said virtual machine monitor has occurred, and an area in which is stored a program module for dispatching said continuous guest virtual machine in the nonguest mode in response to detection of said failure, the method comprising the steps of:

allocating said continuous guest virtual machine to said guest area;

detecting the occurrence of said failure due to said program error of said virtual machine monitor; and starting said program module for dispatching said continuous guest virtual machine in response to the detection of the occurrence of said failure by said detecting means.

7. The method of recovery from a virtual machine monitor failure of a virtual machine system according to claim 6, wherein said virtual machine monitor dedicates to said continuous guest virtual machine an instruction processor of said virtual machine system corresponding to an instruction processor which is used by said continuous guest virtual machine.

8. The method of recovery from a virtual machine monitor failure of virtual machine system according to claim 6, wherein said virtual machine monitor dedicates to said continuous guest virtual machine an input/output interruption subclass of said virtual machine system corresponding to an input/output interruption subclass used by said continuous guest virtual machine.

9. The method of recovery from a virtual machine monitor failure of a virtual machine system according to claim 6, wherein said main storage further includes a hardware system area (HSA) and said virtual machine system saves in said hardware system area (HSA) information which is necessary for continuous operation of said continuous guest virtual machine in response to occurrence of an interception/host interruption.

10. A method of recovery from a hypervisor failure of a logical partition system connected to a main storage said logical partition system, having operation modes including a guest mode in which logical partitions are operated and a nonguest mode in which a hypervisor for controlling said logical partitions is operated including, a continuous guest area having the same host absolute address as a guest absolute address, and being occupied by a continuous guest which is a logical partition which continues to operate even if a failure due to a program error of said hypervisor has occurred, and an area in which is stored a program module for dispatching said continuous guest in the nonguest mode in response to detection of said failure, the method comprising the steps of:

allocating said continuous guest to said guest area;

detecting the occurrence of said failure due to said program error of said hypervisor; and starting said program module for dispatching said continuous guest in response to the detection of the occurrence of said failure by said detecting means.

11. A method for recovery from a failure of a virtual machine system, said system including a real machine having operation modes including a guest mode in which virtual machines implemented by control of a control program are operated and a nonguest mode in which said control program is operated, and a main memory connected to said real machine, the method comprising the steps:

allocating a continuous guest virtual machine to an area of said main memory having the same absolute address as a 1.0 continuous guest virtual machine which executes a program to be continued for execution even if a failure has occurred in said control program;

operating said virtual machine including said continuous guest virtual machine under control of said control program;

detecting the occurrence of said failure due to a program error of said control program;

stopping operation of said continuous guest virtual machine and said control program in response to the detection of the occurrence of said failure by said detecting step; and re-starting processings having been performed on said continuous guest virtual machine in the nonguest mode.

12. The method according to claim 11, wherein said operation step includes a step of storing information relating to said continuous guest virtual machine to a predetermined area of said main memory.

13. The method according to claim 12, wherein said predetermined area is formed of an area of a hardware system which is accessed by a given instruction.

14. The method according to claim 13, wherein said storing step is performed in response to occurrence of an interception/host interruption.

15. The method according to claim 12, wherein said restarting step includes reading information relating to said continuous guest virtual machine and stored in said predetermined area, and a step of loading the information read by said reading step to said real machine.

16. The method according to claim 13, wherein said control program dedicates to said continuous guest virtual machine an instruction processor of said virtual machine system corresponding to an instruction processor which is used by said continuous guest virtual machine.

17. The method according to claim 13, wherein said control program dedicates to said continuous guest virtual machine an input/output interruption subclass of said virtual machine system corresponding to an input/output interruption subclass used by said continuous guest virtual machine.

* * * * *

UNITED STATES PATENT AND TRADEMARK OFFICE
CERTIFICATE OF CORRECTION

PATENT NO. : 5,437,033
DATED : July 25, 1995
INVENTOR(S) : Taro Inoue, et al.

It is certified that error appears in the above-indentified patent and that said Letters Patent is hereby corrected as shown below:

Claim 11, column 13, line 24, delete "1.0".

Signed and Sealed this

Seventh Day of November, 1995

Attest:

BRUCE LEHMAN

*Attesting Officer*      *Commissioner of Patents and Trademarks*